Dec. 27, 1966 L. W. PAINE ET AL 3,295,109

DATA IDENTIFICATION AND RETRIEVAL APPARATUS FOR SERIAL RECORDING SYSTEMS

Filed March 27, 1963 3 Sheets-Sheet 1

INVENTORS
LARRY W. PAINE AND
CHARLES A. STEINBERG
BY Henry Huff
ATTORNEY

INVENTORS
LARRY W. PAINE AND
CHARLES A. STEINBERG
BY [signature]
ATTORNEY

INVENTORS
LARRY W. PAINE AND
CHARLES A. STEINBERG
BY Henry Huff
ATTORNEY

United States Patent Office 3,295,109

Patented Dec. 27, 1966

3,295,109

DATA IDENTIFICATION AND RETRIEVAL APPARATUS FOR SERIAL RECORDING SYSTEMS

Larry W. Paine, Northport, and Charles A. Steinberg, Plainview, N.Y., assignors to Cutler-Hammer, Inc., Milwaukee, Wis., a corporation of Delaware Filed Mar. 27, 1963, Ser. No. 271,547

11 Claims. (Cl. 340—172.5)

This invention relates to improvements in the art of locating, and controlling the reproduction and utilization of, data that is recorded on a recording medium such as a magnetic tape, and more particularly to systems for marking the medium when data is recorded and subsequently searching the medium to locate specified or selected data for reproduction and utilization or processing.

It is common practice to record data, often several different types of data, substantially continuously throughout a period wherein one or more events of particular interest may occur. In physiological research, for example, it may be desired to record a patient's temperature, blood pressure, and electrocardiogram for a certain length of time, then administer an injection of some drug, continuing the recording until the effects of the drug have taken place. A number of groups of data, possibly unrelated to each other, may be recorded similarly in serial manner on the same reel of tape or corresponding unit of recording medium.

To locate specific data for subsequent reproduction, the operator may use a tape footage indicator, referring to notes made in a log when the data was recorded. Another method is to record a footage or a time signal directly on the tape while the data is being recorded. The reproducing device may be arranged to scan or search the record for a selected footage or time mark and automatically stop searching when the desired location is reached. This method involves recording marking signals continuously throughout the record, thus fully occupying one recording channel with a series of location marks, the most of which will never be used.

The principal object of the present invention is to provide improved apparatus for selective retrieval of data recorded in serial fashion as on a magnetic tape.

More specifically, it is an object of this invention to provide apparatus of the foregoing type wherein distinctive location marker signals are recorded at will or concurrently with selected events, and a particular selected marker signal may be used to control a reproducing device to locate the corresponding data.

Another object is to accomplish the above without requiring a separate independent recording channel for location marking, thus permitting the use of a single channel for both data and location records.

A further object is to record the location marker signals in a digital form that is readily readable from a graphical display such as a strip chart record or an oscillogram.

Another object is to provide a system of the described type including means starting and stopping a process, for example re-recording, at preselected times after location of a selected recording.

In a presently preferred embodiment of the invention the location marker signals are in binary digital form, i.e., each mark is represented by a brief series of "bits," each bit having one of two possible values designated as 0 and 1 respectively. For convenience in operation and interpretation of location marker signals, each location is assigned a respective decimal number. In the system, each digit of the decimal number is encoded as a four bit binary number, in known manner, and used in that form. The appropriate location marker number is set up as a switch pattern or in a register prior to the event to be marked by that number. When the event occurs, a signal representing the number is recorded. Subsequently, when the record of data following that particular event is to be reproduced, the location marker number is set up as a switch pattern, for example, by adjustment of number wheels arranged to actuate appropriate switches, and the record is scanned, ordinarily at a substantially higher speed than the normal reproducing speed. As each location marker signal comes up, it is identified as a marker signal, then compared to the preset switch pattern representing the desired location. When the binary bit sequence corresponding to the switch pattern appears, a coincidence signal is produced. The coincidence signal stops the search, and may be used also to start the reproduction of the recorded data.

The invention will be described with reference to the accompanying drawings, wherein.

Figure 1:
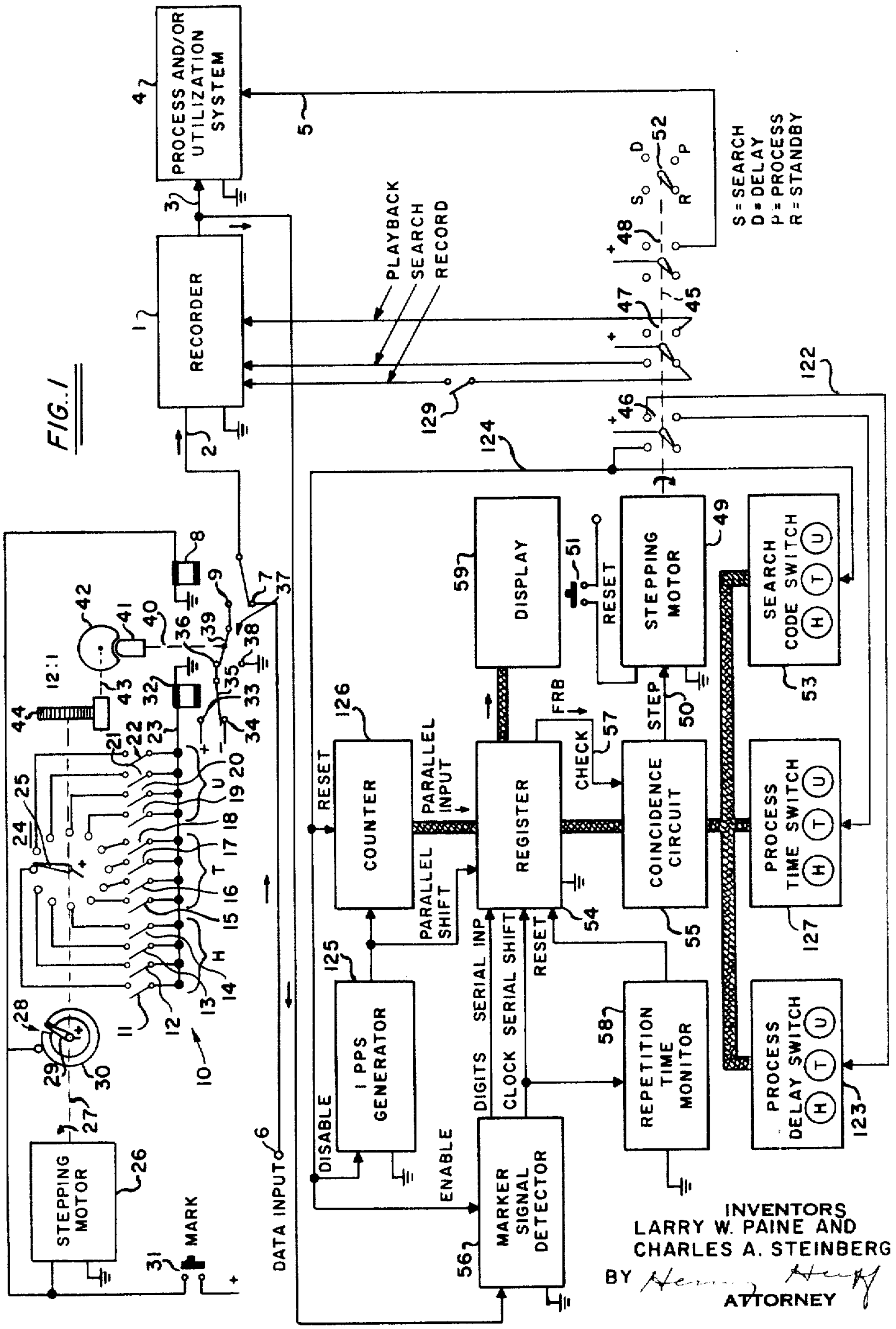
FIG. 1 is a schematic diagram of a complete marker and searcher system, including its connections to a recorder device and a data processing or utilization system.

Referring to FIG. 1, the recorder 1 may be a magnetic tape recorder or any other type device wherein input signals are recorded on a medium serially, and can be reproduced by the device itself or by a separate reproducing device. The reproducing device is assumed to be contained in the block 1 in FIG. 1; however it is to be understood that the tape or other recording medium may be removed from the recorder 1 and used on a physically separate reproducer at a different location, if desired. The recorder 1 may be multi-channel device, capable of recording simultaneously a plurality of input signals independently, as on laterally spaced tracks on a single tape. In FIG. 1 only one channel is indicated, with an input lead 2 for supplying signals to be recorded and an output lead 3 carrying signals that are reproduced. Reproduced signals are conveyed to any desired utilization means 4. As an example, the means 4 might include a cathode ray oscilloscope providing a visible display representing the wave form of the reproduced signal, and a camera arranged to photograph the display when an enabling or actuating signal is applied by way of a lead 5.

The source (not shown) of data signals, to be identified and recorded for subsequent retrieval and reproduction, is connected to an input terminal 6, which is connected through the normally closed lower contact 7 of a relay 8 to the recorder input lead 2. When the relay 8 is energized, the recorder input is transferred to the upper contact 9 and thereby connected to the output of a marker signal generator, generally designated in FIG. 1 by the reference numeral 10.

The marker signal generator 10, as illustrated in detail in FIG. 1, includes a bank of twelve single pole single throw (on-off) switches 11 through 22, each arranged to connect, when closed, a common bus 23 to a respective fixed contact of a twelve position switch 24 having a single movable contact 25. A stepping motor 26 has an output shaft, indicated schematically by the dash line 27, coupled to the movable wiper contact 25 to drive it stepwise in a counterclockwise direction from each fixed contact to the next, in succession, as long as the motor 26 is energized. Normal running energization of the motor 26 is by way of a switch 28 consisting a rotary wiper contact 29 and a fixed acuate contact 30. The wiper contact 29 is connected to one terminal of a power supply as indicated by a + symbol, the other power supply terminal being grounded. Contact 29 is coupled to the shaft 27 to be driven synchronously with the wiper 25 of switch 24. The arcuate contact 30 includes a small gap at a place corresponding to that at which the wiper 25 of switch 24 transfers from the fixed contact connected to switch 22 to the fixed contact connected to the switch 11.

A pushbutton switch 31, designated by the legend "Mark" in FIG. 1, provides momentary energization of the motor 26 for starting. After the motor has moved to close the switch 28, it continues to run, stepping the switch 24 to scan the switches 11 through 22 in succession. When the wiper 25 moves off the contact connected to the last switch 22, switch 28 opens and the motor stops.

The switch bank bus 23 is connected to the actuating magnet of the relay 32 having upper and lower fixed contacts 33 and 34 connected to power supply terminals that are positive and negative, respectively, with reference to ground. The movable contact 35 of relay 32 is connected to the upper fixed contact 36 of a single pole double throw switch 37. The lower fixed contact 38 is grounded. The movable arm 39 of switch 37 is connected to the upper contact 9 of relay 8, and is coupled, as schematically indicated by the dash line 40, to a cam follower 41 cooperating with a cam 42 to throw the switch 37 alternately to its upper and lower positions as the cam is rotated.

The cam 42 is arranged to be driven by a shaft 43, which in turn is driven by the shaft 27 through a gear train 44. The gear train is designed to make the cam 42 rotate through one complete revolution with each step movement of the shaft 27. The cam 42 is so designed, and so phased with respect to the shaft 43, as to maintain the switch arm 39 in its lower position while the wiper arm 25 of switch 24 is between adjacent fixed contacts, and in its upper position during at least a part of each period when the arm 25 is engaging a fixed contact.

The adjustment and operation of the marker signal generator 10 is as follows: The switch 11 through 22 are set to represent, in binary fashion, a three digit decimal number. A closed switch represents a binary one, in the binary digital order or "place" corresponding to that particular switch. An open switch similarly represents a binary zero. The pattern of closed and open switches represents a twelve digit binary number, the position of switch 11 corresponding to the value of the most significant binary digit, and that the switch 22 corresponding to the value of the least significant binary digit.

The switch pattern also represents a decimal number, four switches being required to represent each decimal digit. The first four switches 11, 12, 13 and 14 are assigned the decimal number values 8, 4, 2 and 1 respectively in the hundreds place or order. Thus, if the hundreds digit is to be nine, switches 11 (representing 8) and 14 (representing 1) are closed, switches 12 and 13 being left open. If the hundreds digit is to be seven, switches 12, 13 and 14, representing values 4, 2 and 1 are closed. A hundreds digit of zero valve is represented by opening all switches 11 through 14. The next four switches 15 through 18 similarly represent the decimal tens digit, and switches 19 through 22 represent the decimal units digit.

As an example, the decimal number 963 is encoded as the binary number 100101100011, an in the corresponding switch pattern switches 11, 14, 16, 17 21 and 22 are closed, and switches 12, 13, 15, 18, 19 and 20 are open. Although switches 11 through 22 may be arranged for individual manipulation, it is apparent that each group of four may be arranged to be operated by means of a single control knob calibrated with decimal digits. Various devices for this purpose, such as rotary wafer or drum switch structures with appropriately disposed arcuate contacts, are well known. The entire assembly of switches 11 through 22 and their actuating means will be referred to hereinafter as a "digit switch."

The wiper arm 25 of switch 24 is connected to a power supply, represented by a + symbol in the drawing. As the arm rotates, the power supply is connected in succession to the switches 11 through 22. Those that are closed will complete the circuit to actuate the relay 32, placing the contact 36 of switch 37 at a positive potential. Those that are open will prevent energization of relay 32, placing contact 36 at a negative potential. Thus the potential at point 36 will consist of a sequence of square waves, positive and negative respectively as the corresponding binary digits of the switch pattern are 1 or 0.

The cam operated switch arm 39 carries a part of each wave, positive or negative, to the upper contact 9 of relay 8, but connects the contact 9 to ground for a brief interval between each binary digit bit signal and the following one. The result is a three valued (positive, zero, or negative) step wave of the type illustrated in FIG. 3A. The first four binary digits represented by the wave shown in FIG. 3A are 1, 0, 0, 1, corresponding to the decimal digit 9.

The relay 8 is energized through switch 28 while the marker signal is being produced, applying the marker signal to the input lead 2 of the recorder. When switch 28 opens, the relay 8 drops to its contact 7 connecting the data input terminal to lead 2 and disconnecting the marker generator.

The marker generator digit switch may be reset, manually or automatically, to a new number after the marker signal has been recorded. Each time it is desired to mark another point or event, the button 31 is depressed and the above-described operation is repeated.

Any data signals presented to the input terminal 6 during operation of the marker signal generator will be lost, i.e., not recorded. Such loss is not objectionable in practice because any data occurring immediately prior to the event marked can usually be dispensed with; if it is desired to record data continuously through the marking interval, such data can be recorded on a separate channel. The channel used for recording marker signals is available for data recording at all times except when a marker signal is being recorded.

In a completed record, the track or channel that is used for marking may contain up to 1000 separate marker signals, interspersed with various data recordings and perhaps blank spaces, of random lengths. To locate a desired recording, the record is played back, preferably at a speed substantially higher than the normal play-back speed; each reproduced marker signal is first identified as a marker, and then evaluated to determine if it is or is not the one being sought.

The reproduced signals may be exhibited visually, as on a cathode ray oscilloscope, and observed by an operator. Alternatively, if the record is, or has been converted to, a visually readable recording such as a strip chart, the operator may examine that to find the desired marker. Searching by an operator is useful particularly when the approximate location of the desired marker is known, so that only a limited area of the recording medium need be searched.

Binary coded decimal number marker signals of the type shown in FIG. 3A are especially suitable for visual searching because their uniform width step-like appearance is readily distinguishable from that of most data recordings, and from practically any analog recording. Furthermore, the ability to translate such signals to decimal numbers can be developed easily with little practice, even by a relatively unskilled operator.

The system of FIG. 1 also includes means for automatically searching a record, and supplying control signals to start, time, and stop the operation of the reproducing means and of external equipment that uses or processes the reproduced data. In the present example, four principal operating modes are available: Search, Delay, Process, and Standby. The mode is selected by positioning a shaft 45 connected to three ganged rotary four-position switches 46, 47, and 48. Switch 46 controls the digitally operating part of the system, as will be described, to perform the marker signal identification and selection, and timing functions. Switch 47 controls the recorder 1, and switch 48 controls the utilization system 4.

The mode selector shaft 45 is coupled to a stepping motor 49, designed to move the shaft through one step, e.g., from Search to Delay, in response to an impulse applied to input lead 50. The motor 49 may include means for returning the shaft 45 to a starting position, such as Search, upon operation of a reset pushbutton 51. Alternatively, the shaft 45 may be set manually to any of its four positions, by means of a knob 52.

The automatic searcher part of the system includes a search code switch 53, a register 54, a coincidence circuit 55, and a marker signal detector 56. The marker signal detector receives reproduced output signals, marker and data, from the recorder 1, rejects the data and any extraneous signals such as noise, and passes the marker signals to the register, where they are stored until the register is reset. The individual bits of the marker signal are stored in the register serially, as they are received. When a complete marker signal has been stored, the register contains a binary digital pattern representing that marker, and produces a "full register bit' or check pulse, that is applied to the coincidence circuit 55 by way of a connection 57. The check pulse enables the coincidence circuit to compare the pattern in the register with that in the digit switch 53. If and only if the patterns agree, the coincidence circuit produces a pulse on the step input lead of motor 49.

The register 54 must be reset after each coincidence check, in preparation for storage of another binary pattern and subsequent coincidence check. For this purpose, and also to discriminate against incomplete marker signals, the register is reset in response to a pulse produced by a repetition timing monitor, as "time's up" device 58. The marker signal detector is arranged to produce a clock pulse upon the arrival of each bit, whether 0 or 1, of the marker signal. A complete marker signal will produce twelve such pulses, evenly spaced. The monitor 58 will produce an output pulse only after it has received a clock pulse, and then only if that clock pulse is not followed by another one before a predetermined time (slightly longer than the normal clock pulse period) has expired.

Accordingly, if an incomplete marker signal is received, for example because the search operation was started during reproduction of a marker, the clock pulses will stop before the register is full, and the monitor 58 will reset the register. This is necessary because otherwise the register would store the incomplete marker, then store enough of the first part of the subsequent marker to fill it, produce the full register bit and enable the coincidence circuit, at a time when the register contains a "wrong number."

When a complete marker signal is received, the monitor 58 waits for a thirteenth clock pulse which does not come, then resets the register. In the meantime, the register has produced a full register bit to check for coincidence.

The register 54 may be provided with a display device 59, designed in known manner to exhibit a decimal digital representation of the pattern in the register. For convenience, the display device may be arranged to be set from the register in response to each full register bit, and to retain the setting until the next full register bit occurs. In this manner, an indication of the most recent meaningful contents of the register is maintained even after the register has been reset and started to accumulate a new number.

Figure 2:
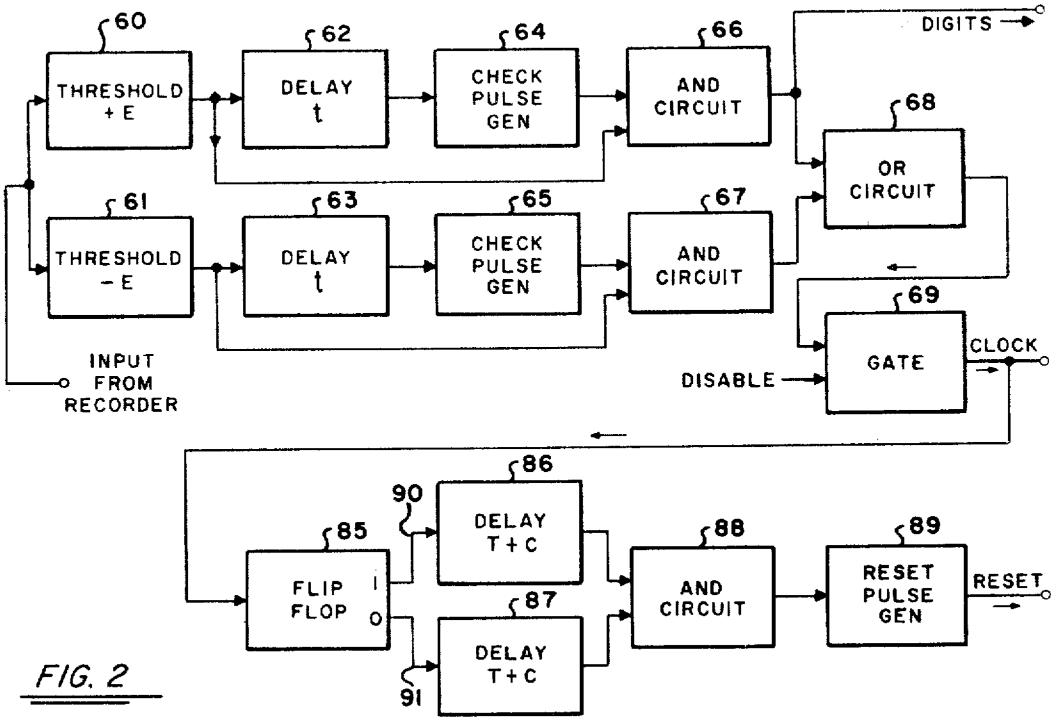
FIG. 2 is a schematic block diagram showing details of the marker signal detector and the repetition time monitor devices of the system of FIG. 1.

Referring to FIG. 2, a presently preferred type of marker signal detector 56 consists of positive and negative threshold devices 60 and 61, delay devices 62 and 63, pulse generators 64 and 65, "and" circuits 66 and 67, an "or" circuit 68, and a gate circuit 69. The function of the threshold device 60 is to produce an output level change whenever the input signal crosses a predetermined voltage level, +E, in a positive going sense. Any of a variety of known circuits are suitable, one example being the so-called Schmitt trigger circuit. The threshold device 61 is similar to the device 60, but designed to produce an output level change when the input signal crosses a voltage level −E, in a negative going direction.

Delay devices 62 and 63 may be monostable multivibrators designed to produce a single output pulse of predetermined duration $t$ in response to each input level change. Delay devices 62 and 63 may be nominally identical, with their pulse width determining circuit elements adjusted or adjustable to make $t$ approximately equal to one-half the normal duration of a marker signal bit pulse as reproduced in the search mode operation of the system of FIG. 1.

Check pulse generators 64 and 65 may be blocking oscillators or equivalent devices, designed to produce single output pulses in response to the trailing edges of the respective output pulses from the delay devices 62 and 63.

The "and" circuits 66 and 67 are conventional devices with two input circuits so arranged to provide output only when both input circuits are excited simultaneously. The "or" circuit 68 is another conventional type of two-input device, arranged to provide output whenever signals are applied to either or both the input terminals.

The operation of the marker signal detector is depicted by the graphs of FIGS. 3A through 3F. FIG. 3A shows a part of a typical marker signal as received from the recorder. First positive going pulse 70 exceeds the level +E, causing threshold device 60 to produce a level change, not shown, that starts a delay pulse 71 (FIG. 3B). The pulse 71 lasts for a time $t$, then stops abruptly, causing the check pulse generator 64 to produce a pulse 72 (FIG. 3C). This pulse is applied to one input of the "and" circuit 66, and the output of threshold device 60 is applied to the other input of the "and" circuit. Since both the threshold output and pulse 72 are coexistent, the "and" circuit produces an output pulse similar to and coincident with the pulse 72. The presence of such a pulse in the output of "and" circuit 66 indicates that the pulse 70 has an amplitude of at least +E, and a duration of at least $t$, and may be accepted as a valid marker bit pulse representing a binary 1.

In similar fashion, the negative going marker bit pulse 73 in FIG. 3A passes the negative threshold 61, causes the delay device 63 to produce a pulse 74 (FIG. 3D) which in turn makes the pulse generator 65 produce check pulse 75 (FIG. 3E). Coexistence of bit pulse 73 and check pulse 75 causes the "and" circuit 67 to produce an output pulse substantially identical to and coincident with the pulse 75.

Subsequent marker bit pulses 76, 77 and 78 produce check pulses 79, 80, and 81, respectively, and corresponding substantially identical output pulses from the "and" circuits 66 and 67. These output pulses, applied to the "or" circuit 68, result in a train of uniformly spaced clock pulses 82 (FIG. 3F).

Figure 3:
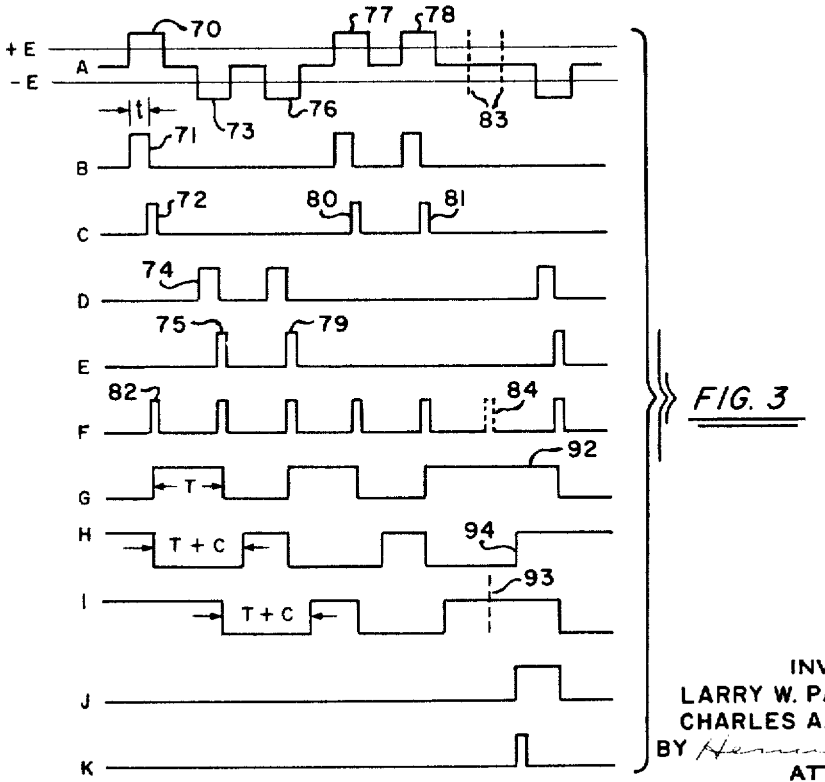
FIG. 3 is a group of graphs showing wave forms of the signals occurring at various points in the circuit of FIG. 2 under certain operating conditions.

Dash lines 83 in FIG. 3 indicate a period within which a marker bit pulse would be expected. If the pulse does not arrive, or is not of sufficient amplitude to trigger one of the threshold circuits 60 and 61, no delay pulse occurs and no check pulse is produced, and the expected clock pulse is missing, as indicated at point 84 in FIG. 3F. If an input pulse of sufficient amplitude does arrive, one of the delay devices 62 or 63 will be activated and the respective check pulse generator will operate after an interval $t$. However, the respective "and" circuit 66 or 67 will not respond unless the input pulse is still in existence when the check pulse occurs. Thus an input pulse shorter than $t$, such as might be caused by certain types of data signal or by noise, will not result in a clock pulse.

The described marker signal detector applies two criteria to each received pulse to accept it as a valid marker pulse: the amplitude must be equal to or greater than E, and the duration must be equal to or greater than $t$. It is clearly possibly that a false response could be produced by a data signal or a noise that meets the amplitude and duration specifications. Various additional criteria could be included to reduce the probability of false acceptances; for example, the marker bit pulses could be made to have a peculiar shape, or a particular carrier frequency, and the marker signal detector arranged to identify conformance with that characteristic. Alternatively, the marker signal detector could be designed in known manner to require that each marker bit pulse be repeated one or more times before being accepted as valid. In practice, the relatively simple amplitude and duration criteria have been found satisfactory.

The repetition time monitor 58 of FIG. 1 is shown at the lower portion of FIG. 2, and consists of a bistable multivibrator or 'flip flop" circuit 85, a pair of delay devices 86 and 87, an "and" circuit 88, and a pulse generator 89. The flip flop 85 has the characteristic of remaining in one of its stable states until actuated by an input pulse, whereupon it transfers to its other stable state and remains thus until another input pulse is applied. The two states may be designated 1 and 0. Output lead 90 is energized in the 1 state and de-energized in the 0 state. Lead 91 is energized in the 0 state and de-energized in the 1 state.

The delay devices 86 and 87 are a known type of monostable multivibrator circuit or equivalent means, designed to produce an output wave that begins substantially coincidentally with an input level change, and persists for a predetermined length of time $T+C$. In the present example the outputs of the delay circuits are assumed to be negative-going. However, the actual polarity is not important.

The outputs of the delay circuits 86 and 87 are combined in the "and" circuit 88, which is of conventional design and provides output only when both inputs are in their positive-going state, in the present example. The beginning of an output wave from the "and" circuit 88 causes the pulse generator 89 to produce a reset pulse.

In the operation of the repetition time monitor, each clock pulse 82 (FIG. 3F) changes the state of the flip flop 85, as indicated by the graph of FIG. 3G, which may be assumed to represent the "1" output on lead 90. This is normally a square wave of duration T, where T is the marker bit repetition period. Upon each change of the flip flop from its 0 state to its 1 state, the delay circuit 86 starts a negative going wave (FIG. 3H) which persists for a time $T+C$. Similarly, the delay circuit 87 starts a wave of duration $T+C$ (FIG. 41) upon each change of the flip flop from its 1 state to its 0 state. As long as each clock pulse is followed by another after an interval less than $T+C$, one of the waves of FIGS. 3H and 3I will be in a negative state and the "and" circuit will produce no output. When a clock pulse is missing as at 84 in FIG. 3F, the flip flop 85 will remain in the state it was placed in by the last clock pulse, e.g., 1, as shown at 92 in FIG. 3G. In this case the delay circuit 87, which would have started a negative going excursion at the point 93 in FIG. 3I, fails to do so. Shortly thereafter, the delay circuit 86 concludes its last negative excursion, at point 94 in FIG. 3H. At this time the outputs of both delay circuits 68 and 87 are in the positive state, resulting in an output (FIG. 3J) from the "and" circuit 88, which causes the pulse generator 89 to produce the reset pulse shown in FIG. 3K.

Figure 4:
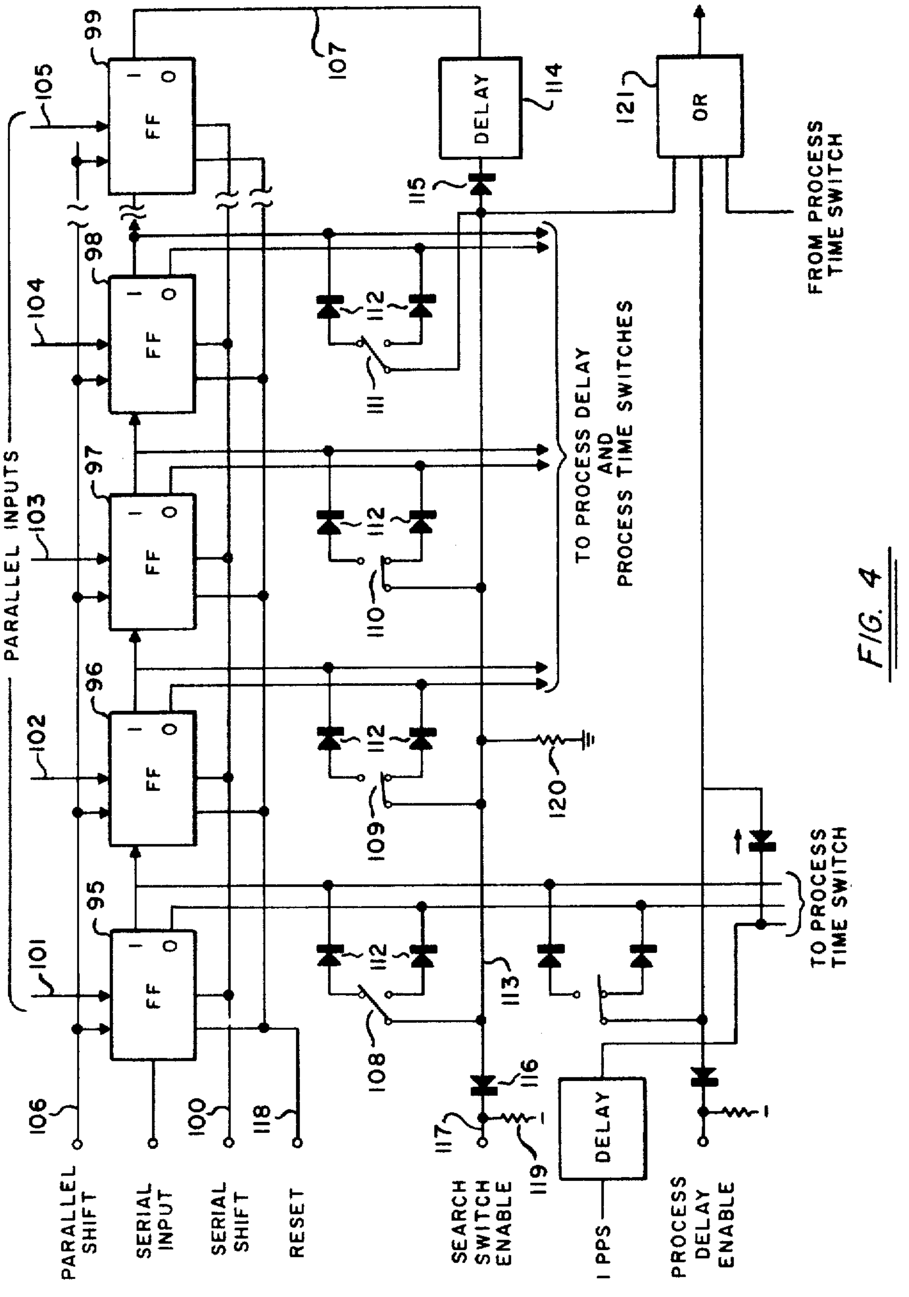
FIG. 4 is a schematic diagram showing details of the register, coincidence circuit, and marker and time selector switches of the system of FIG. 1.

Referring now to FIG. 4, the register 54 in the system of FIG. 1 consists of a series of flip flop circuits 95, 96, 97, 98, and nine others, only the last of which, 99 is shown. The thirteen flip flops are interconnected in well-known manner to accept two-level signals, such as on-off, representing binary digital bits 0 and 1, in serial fashion, transferring each bit to the next subsequent stage in response to a pulse on the serial shift input lead 100. The register will also accept parallel inputs on leads 101 through 104 and 105, transferring the bits presented to said leads to the respective stages simultaneously upon energization of the parallel shift input lead 106. A reset pulse applied to input lead 118 will reset the register. In the present arrangement, all stages except the first, 95, are reset to zero. The first stage is connected so as to be reset to 1 in response to the reset pulse.

Each flip flop stage has two terminals, indicated as 1 and 0 respectively in FIG. 4. When the stage is in a state representing a binary 0, the 1 terminal is placed at a characteristic voltage level, negative in the present example, while the 0 terminal is at some other voltage level, such as ground or positive. When the stage is in a state representing a binary 1, the situation is reversed; the 1 terminal maintains a positive level and the 0 terminal maintains a negative level.

The digits output line of the marker signal detector is connected to the serial input terminal of the register, and the clock output line to the serial shift input 100. When a marker signal is accepted and passed by the marker signal detector, each clock pulse (82, FIG. 3F) shifts the bit, 0 or 1, stored in each stage of the register to the next succeeding stage. The first stage 95, having been set initially to 1, passes a 1 to the next stage 96 in response to the first clock pulse. As each marker bit appears, it is shifted into the first stage, then shifted to the next stage by the following clock pulse, and so on.

After twelve successive marker bits have been stored, the last stage 99 contains the 1 which was originally set into the first stage 95. The twelfth marker bit, which is the last one of a complete marker signal, produces a clock pulse that shifts the 1 into the last stage 99. This causes lead 107 to become positive. This signal on lead 107 is called a "full register" bit, since its presence indicates that the register is full, i.e., has received twelve successive serial shift pulses. Note that the register could be full, even if all stages were at zero.

The search code digit switch 53 of FIG. 1 is generally similar to the digit switch 11–22 of the marker generator, but consists of a group of twelve single pole double throw switches 108–111 (see FIG. 4) and others, not shown. The fixed contacts of each switch are connected to the 1 and 0 outputs of the respective register flip flop stages, by way of rectifier diodes 112 so poled as to conduct when the corresponding flip flop terminal is negative. The movable arms of the switches 108–111, etc., are all connected to a common bus 113. The full register bit on lead 107 is also applied to bus 113 through a delay circuit 114 and a diode 115. In addition, the bus 113 is connected to the search switch enable lead 117 through diode 116. The lead 117 is biased to a negative potential by way of a resistor 119 connected to a source indicated by a minus symbol.

The diodes 112 and their interconnections with the digit switches and register stages constitute the coincidence circuit 55. The digit switches 108–111, etc., are operated to select the number to be sought, in the same manner as switches 11–22 are operated in the marker generator to select a marker number. Each switch is thrown to connect the but 113 to the 1 or to the 0 terminal of the related register stage, depending upon whether a 0 or 1 is to be selected in the corresponding binary place.

The bus 113 is connected to ground or to a point of positive potential through a resistor 120 of relatively high resistance. However, it will remain at a negative potential as long as a negative voltage is applied to it through any of the diodes 112, 115 or 116. When a positive voltage is applied to the search switch enable lead 117 (by way of mode selector switch 46, FIG. 1), the diode 116 is back-biased, and acts as an open circuit. Similarly, when any register stage is in the state, 0 or 1, corresponding to the setting of the respective digit switch, the respective diode 112 will be back-biased and act as an open circuit. Further, a positive full register bit reaching the diode 115 through the delay circuit 114 will open that diode. The bus 113 assumes the ground or positive potential toward which it is biased through resistor 120 when, and only when, the three conditions exist: search enable, agreement between register and digit switches, and full register bit. The change in the voltage on bus 113 in the positive direction is the coincidence signal, which goes through an "or" circuit 121 to the step input lead 50 (FIG. 1) of the motor 49.

Referring again to FIG. 1, when the mode selector is set at "delay," a positive enable voltage is applied by way of lead 122 to digit switch 123 which is identical to the search code switch 53 but is set by the operator to select the number of units of time, e.g., seconds, that it is desired to delay the beginning of operation of the system 4 after a selected marker signal has been found. Removal of voltage on lead 124 simultaneously disables the clock pulse gate of the marker signal generator, and enables a timing generator 125 to produce pulses at a rate of one per second. The timing pulses go to a twelve stage binary counter 126, and to the parallel shift input of the register 54. Each stage of the counter 126 is coupled to the corresponding stage of the register in known manner so that the pattern in the counter is transferred to the register upon each pulse from the generator 125. The register is reset immediately after each such transfer by the repetition time monitor 58, which is receiving no clock pulses. In this mode of operation, the last stage of the register 54 is kept at 1 to continuously provide a full register bit to the coincidence circuit 55.

When the counter has reached a count corresponding to the number of seconds set on the process delay switch 123, the coincidence circuit produces a signal to step the motor 49 and set the mode selector on "process."

During the transition from "delay" to "process" the generator 125 is disabled momentarily, and the counter 126 is reset to zero. A process time switch 127, identical to switch 123, is set to select the number of seconds that is desired to operate the system 4. As in the delay mode, the counter 126 transfers its current number into the register upon each pulse from the timer 125, and when the selected number of seconds has elapsed, the resulting coincidence signal causes the motor 49 to step to the next position, setting the mode selector switches to "standby."

In the standby mode, the reproducing operation of the recorder 1 and the opertion of the process system 4 are stopped. The recorder may be operated to record data by closing a switch 129.

To start the search, delay and process cycle, the reset button 51 is pressed, causing the motor 49 to set the shaft 45 at the search position. The process delay and/or the process time modes may be by-passed by setting the appropriate digit switch 123 or 127 to zero.

We claim:

1. A data retrieval and process control system for use with a recording system adapted to receive data signals representative of phenomena resulting from or related to the occurrence of specific events and to record such signals upon a recording medium and subsequently reproduce the recorded signals for display and utilization or processing, comprising means for producing respective marker signals upon the occurrence of such events, said marker signals differing distinguishably from each other and from any type of data signal to be received, and means for applying said data signals along with serially interposed marker signals to said recording system; marker signal detector means for receiving said serial data and marker signals reproduced by said recording system, rejecting the data signals and passing the marker signals, marker signal selector means adjustable to respond to a selected one only of the passed marker signals and to produce a coincidence signal in response thereto, and control means responsive to said coincidence signal to initiate an operation.

2. The invention set forth in claim 1, further including mode selector means associated with said control means for selecting one of a plurality of operations to be initiated by said control means in response to a coincidence signal, and interval timer means adapted to start in response to a starting signal and produce an output signal at the end of an interval of selectable length, one of said operations selectable by said mode selector means being that of applying a starting signal to said interval timer means and starting a process in response to an output signal from said interval timer means.

3. The invention set forth in claim 1, wherein said marker signals are pulse trains representing decimal digits in a binary code, and said marker signal detector means includes means for rejecting pulses of substantially less duration than the pulses of said marker signals.

4. The invention set forth in claim 1, further including repetition time monitor means responsive to the passed marker signal pulses to produce a reset signal upon failure of a marker pulse to occur within a predetermined interval after each marker pulse, and means responsive to said reset signal to prevent false coincidence signals from being produced by incomplete marker signals.

5. Marker signal selector means for serially receiving input signals that include data signals and marker signals serially interposed in said data signals, and for initiating an operation in response only to a selected marker signal, said marker signals being independent groups of successively occurring digital bits wherein the digital bits are distinguishable from any data signal to be received and the groups of digital bits of respective marker signals are distinguishable from each other, said means comprising, marker signal detector means responsive to serially received data and interposed marker signals and operable to reject the data signals and to pass the digital bits of the marker signals, means for temporarily storing the digital bits of a marker signal passed by said detector means, means for comparing the digital bits of a stored marker signal with digital bits of a signal representing said selected marker signal to produce a coincidence signal when the stored marker signal corresponds to the selected marker signal, and means responsive to said coincidence signal to initiate an operation relating to data signals occurring after said selected marker signal.

6. Marker signal selector means for serially receiving input signals that include data signals and marker signals interposed in said data signals, and for initiating an operation in response only to a selected marker signal, said marker signals being independent groups of successively occurring digital bits wherein the digital bits are distinguishable from any data signal to be received and the groups of digital bits of respective marker signals are distinguishable from each other, said means comprising, marker signal detector means responsive to serially received data and interposed marker signals and operable to reject data signals and to pass digital bits of the marker signals, storage means for storing the group of digital bits of each marker signal passed by said detector means, means for resetting said storage means after the termination of a continuous succession of digital bits, means for comparing a stored group of digital bits with a signal corresponding to a desired marker signal, said comparing means producing an output signal when a stored group of digital bits represent the desired marker signal, means responsive to said output signal for initiating an operation relating to data signals occurring after said desired marker signal.

7. The combination claimed in claim 6 wherein the marker signals are distinguishable from the data signals by being comprised of pulses that exceed a given amplitude and exceed a given duration, and wherein said marker signal detector means is comprised of, pulse amplitude selector means operative to pass only pulses whose amplitudes exceed the given amplitude, and pulse duration selector means operative to pass only pulses whose durations exceed the given duration.

8. The combination claimed in claim 6 and further including, signal reproducing means adapted to receive a medium having interposed data and marker signals recorded on the same track thereon and to reproduce said data and marker signals, and means for coupling reproduced data and marker signals as input signals to said marker signal detector means.

9. The combination claimed in claim 8 wherein said means responsive to said output signals includes means for controlling the operation of the signal reproducing means.

10. The combination claimed in claim 8 and further including, means for providing a process signal that is comprised of a plurality of digital bits that represent a seletced time interval, means responsive to an enable signal for providing a succession of timing pulses, means responsive to said timing pulses for accumulating received timing pulses and providing an accumulated pulses signal representing the total number of timing pulses received after said enable signal, means responsive to said accumulated pulses signal and to said process signal for providing a coincidence signal when the accumulated pulses represents said selected time interval.

11. The combination claimed in claim 10 wherein said means for initiating an operation relating to data signals occurring after said desired marker signal is responsive to said coincidence signal.

References Cited by the Examiner

UNITED STATES PATENTS

| | | | |
|---|---|---|---|
| 2,740,106 | 3/1956 | Phelps | 340—147 |
| 2,771,596 | 11/1956 | Bellamy | 340—177 |
| 2,941,188 | 6/1960 | Flechtner et al. | 340—174 |
| 2,979,565 | 4/1961 | Zarcone | 178—50 |
| 3,017,610 | 1/1962 | Auerbach et al. | 340—172.5 |
| 3,018,959 | 1/1962 | Thomas | 235—167 |
| 3,129,409 | 4/1964 | Perley | 340—172.5 |

ROBERT C. BAILEY, *Primary Examiner.*

WALTER W. BURNS, *Examiner.*

R. RICKERT, *Assistant Examiner.*